(12) United States Patent
D'Ambro, Sr. et al.

(10) Patent No.: US 6,596,329 B2
(45) Date of Patent: Jul. 22, 2003

(54) METHOD FOR PREPARING PRODUCE

(76) Inventors: Dominic D'Ambro, Sr., 24 Flintshire Rd., Malvern, PA (US) 19355; Dominic D'Ambro, Jr., 124 Church St., West Chester, PA (US) 19382

(*) Notice: Subject to any disclaimer, the term of this patent is extended or adjusted under 35 U.S.C. 154(b) by 0 days.

(21) Appl. No.: 10/016,171

(22) Filed: Dec. 6, 2001

(65) Prior Publication Data

US 2003/0106438 A1 Jun. 12, 2003

(51) Int. Cl.[7] .................................................. A23P 1/00
(52) U.S. Cl. ...................................... 426/484; 426/481
(58) Field of Search ................................. 426/484, 481; 99/538, 509, 537; 83/451, 437.1

(56) References Cited

U.S. PATENT DOCUMENTS

| | | |
|---|---|---|
| 944,087 A | 12/1909 | Gloekler et al. |
| 2,297,177 A | 9/1942 | Tiffany |
| 2,560,229 A | 7/1951 | Leavens |
| 2,645,262 A | 7/1953 | Marasco |
| 3,369,582 A | 2/1968 | Giangiulio |
| 3,830,151 A | 8/1974 | Gerson |
| 4,095,518 A | * 6/1978 | Jones |
| 4,569,280 A | 2/1986 | D'Ambro et al. |
| 5,337,480 A | 8/1994 | Codikow |
| 5,375,512 A | 12/1994 | Ertmer |
| 5,421,249 A | 6/1995 | Repisky et al. |

* cited by examiner

Primary Examiner—Anthony J. Weier
(74) Attorney, Agent, or Firm—Gary M. Cohen

(57) ABSTRACT

A process for preparing produce includes a base having a cradle for receiving the produce which is to be processed, and a reciprocating head which cooperates with the cradle and which includes one or more blades for operating upon the produce which is positioned in the cradle. A single blade is positioned for alignment with center portions of the produce to sever the core membrane of the produce as the head is lowered onto the base. An opposing pair of blades are positioned for alignment with end portions of the produce for removal of the end portions of the produce as the head is lowered onto the base. The base of the apparatus further preferably includes a retaining element which extends over the cradle for receiving the produce, for maintaining the produce in the cradle during operations of the apparatus on the produce.

36 Claims, 5 Drawing Sheets

METHOD FOR PREPARING PRODUCE

BACKGROUND OF THE INVENTION

The present invention relates to the preparation of produce, primarily citrus produce and the like, for use by bars, restaurants and other establishments.

Various food service establishments, primarily bars and restaurants, make use of prepared produce in conjunction with the beverages and foods they serve. As an example, citrus produce is often used to dress a served item, such as a beverage or platter. The citrus produce which is most commonly used for this is the lemon, although other citrus produce, including oranges and grapefruits, are also used.

A common preparation is to section the produce, either for placement on a food platter or for attachment to (i.e., hung from) the rim of a glass containing a served beverage. Such sectioning is often performed manually, by hand, using a knife. Not only is such a process extremely time consuming, but there is also a significant potential for injury to the persons performing the process.

For these reasons, a number of mechanical devices have been developed in an effort to automate the preparation of such produce to some extent. Such devices generally include a base for receiving the produce and a reciprocating head assembly which can cooperate with the base to drive the produce through a series of blades configured to create desired sections of the produce.

While such devices have assisted in automating the sectioning process, the results achieved have not been entirely satisfactory. For example, the sections produced using such devices have generally tended to be irregular, in shape and in sharpness of the cut, leading to an unattractive service or excess waste in the event the irregular produce is discarded.

Additional limitations were often encountered when using such devices for the sectioning of lemons, primarily resulting from the projecting end portions (hereafter referred to as "nubs") associated with such produce. For example, the resulting lemon wedges tended to include portions of the projecting nubs following the sectioning process. This tended to compromise the appearance of the resulting wedges. This also tended to make it more difficult to grasp the lemon wedges for purposes of squeezing.

Such devices also made no provisions for a common and preferred use for lemon wedges, that being the attachment of a lemon wedge to the rim of a glass containing a served beverage. In order to hang a lemon wedge from the rim of a glass, it is first necessary to sever remnants of the membrane forming the core (or spine) which extends longitudinally through the axial center of a whole lemon, between its end nubs, which may or may not remain present after the lemon has been divided into sections. To this end, common practice is to slit the exposed pulp of each lemon wedge, near the center of the section which is produced. The slit can then receive the rim of the glass, allowing the lemon wedge to be hung from the glass.

To date, whether the lemon sections are produced manually or with the assistance of a mechanical device, it remains necessary to manually produce the slit needed to allow the resulting wedges to be hung from the rim of a glass. This reintroduces the very limitations the sectioning devices were designed to eliminate, that being a process which is not only time consuming, but which carries with it a significant potential for injury to the persons performing the slitting operation.

SUMMARY OF THE INVENTION

In accordance with the present invention, disadvantages such as the foregoing are overcome by providing a device which is configured to initially prepare produce which is to be sectioned so that, following the sectioning process, the sections produced are clean, uniform, and ready to be hung from the rim of a glass. Such a result is achieved automatically, and with a high degree of uniformity, automating processes which had previously required manual operations to perform. As a result, the preparation of sectioned produce for use in a bar or restaurant setting is accomplished efficiently and at a significantly enhanced rate, while simultaneously avoiding the potential for injury which was characteristic of prior, manual processing techniques.

The description which follows will primarily discuss the improvements of the present invention in the context of the preparation of lemon sections, or wedges, for desired uses in a bar or restaurant. Nevertheless, it is to be understood that the improvements of the present invention will also find use with other varieties of citrus fruit, such as limes, oranges and grapefruits, as well as other types of fruits and vegetables, in applications other than bar and restaurant applications.

In its preferred configuration, the apparatus of the present invention includes a base having a cradle for receiving the produce which is to be processed, and a reciprocating head assembly which cooperates with the cradle and which includes one or more blades for operating upon the produce which is positioned in the cradle. The base of the apparatus further preferably includes a retaining element which extends over the cradle for receiving the produce, for maintaining the produce in the cradle during operations of the apparatus on the produce. Opposing guides operate to connect the base of the apparatus with the head so the head can reciprocate along the guides, toward and away from the base. The head of the apparatus further includes a blade-receiving fixture which is positioned so that reciprocation of the head relative to the base will bring any blades associated with the fixture into appropriate contact with the produce resting in the cradle of the base.

The head of the apparatus can include an opposing pair of blades which are positioned to align with end portions of the produce, for example, the end nubs of a lemon, for contact with and removal of the end portions of the produce as the head is lowered onto the base. The head of the apparatus can also include a single blade which is positioned to align with center portions of the produce, for piercing into the produce to a point which lies beyond the core membrane which extends longitudinally through the produce, to sever the core membrane as the head is lowered onto the base.

For a further discussion of preferred embodiments of the present invention, reference is made to the detailed description which is provided below, taken in conjunction with the following illustrations.

DETAILED DESCRIPTION OF THE INVENTION

Figure 1:
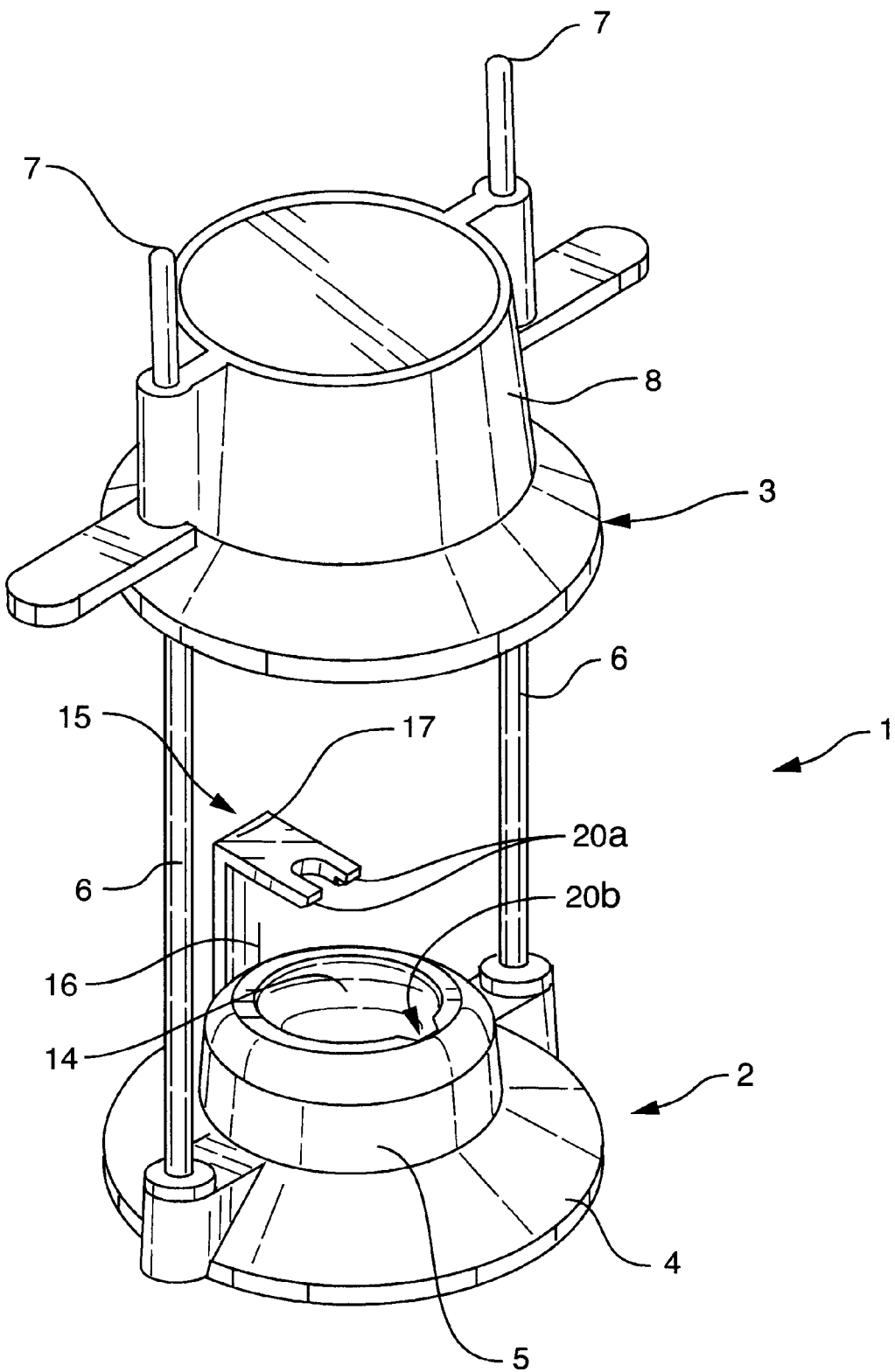
FIG. 1 is an isometric view of an apparatus produced in accordance with the present invention.

FIG. 1 shows an apparatus 1 for preparing produce in accordance with the present invention. In the description which follows, the structure and operation of the apparatus 1 will be described in conjunction with lemons, for desired uses in a bar or restaurant. It is to be understood that the improvements of the present invention will also find use with other varieties of citrus fruit, such as limes, oranges and grapefruits, as well as other types of fruits and vegetables, in applications other than bar and restaurant applications.

The apparatus 1 is generally comprised of a base 2 and a head 3 which are coupled for reciprocation relative to each other. The several components of the apparatus are preferably formed of a material which is readily cleaned and disinfected, to support use of the apparatus 1 in the food service industries, and are preferably formed of a resilient material to provide the apparatus 1 with a useful service life. Machinable metals, such as aluminum, can be used for this and are presently considered preferred. Castable metals may also be used, as may moldable plastic materials, so long as the material selected is capable of withstanding the conditions of an appropriate cleaning.

Figure 2:
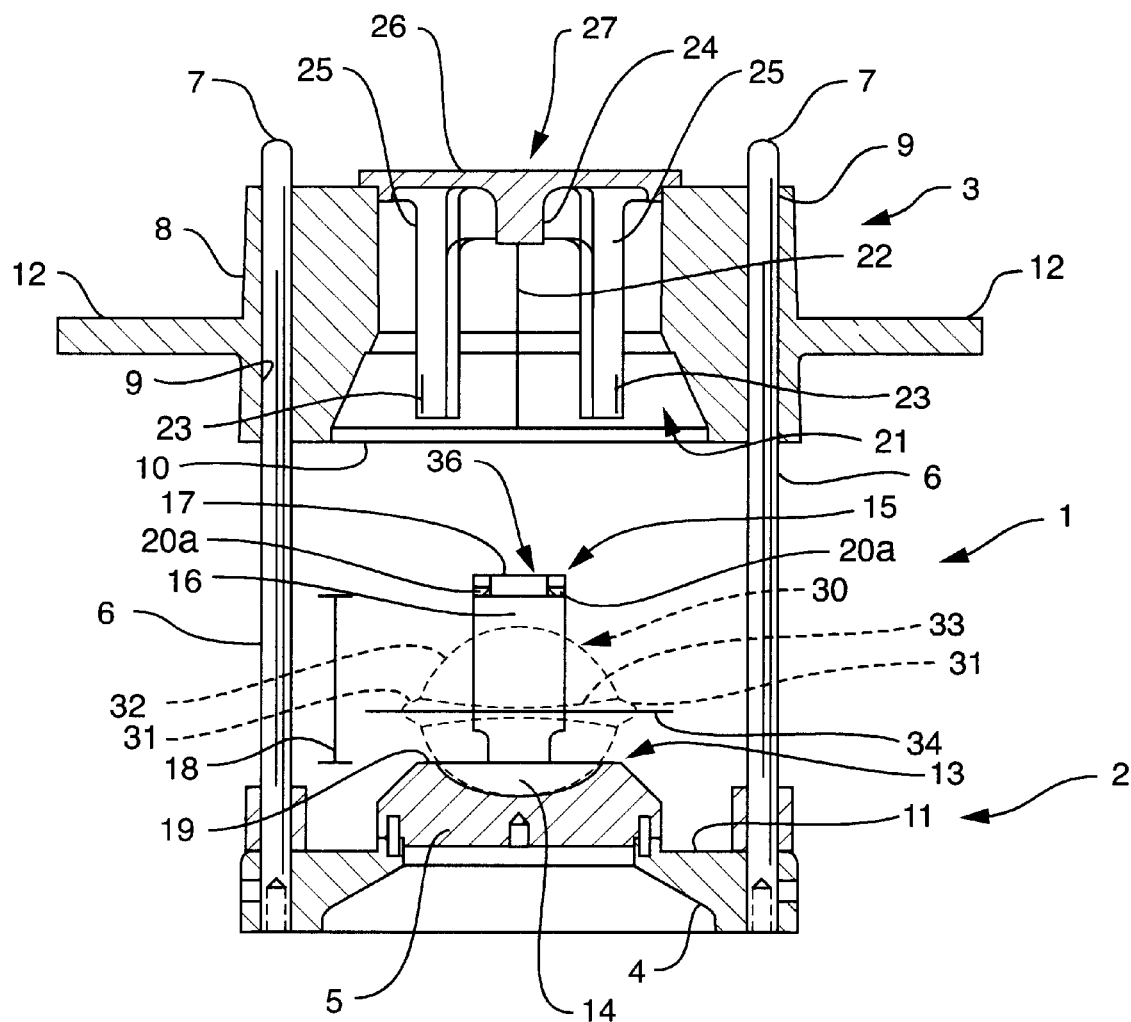
FIG. 2 is a cross-sectional view of the apparatus shown in FIG. 1.

Referring now to FIGS. 1 and 2, the base 2 includes a frame 4 for resting upon a desired surface, and a pedestal 5 which is coupled with and which extends upwardly from central portions of the frame 4. A conical frame 4 is illustrated, and is presently preferred in view of its ease of manufacture and because of the stability of such a structure, although other shapes may also be used. The pedestal 5 is illustrated as a separate structure, which is attached to cental, upper portions of the frame 2, although unitary structures could equally be implemented, if desired.

A pair of guides 6 are attached to and extend upwardly from the base 2, and are preferably located at diametrically opposing sides of the frame 4. The guides 6 can be mechanically fastened to the base 2 using any of a variety of fasteners (for example, screws, bolts, etc.) or by a direct threaded connection. The guides 6 are illustrated as rod-shaped structures, and are preferably rounded at their top ends 7 for purposes of safety. Guides having a different cross-sectional shape, such as an oval, square or rectangular shape, may also be used, if desired. The top ends 7 can also be shaped as desired.

The head 3 includes a body 8 having longitudinally extending bores 9 for receiving the guides 6 which extend from the base 2. The bores 9 are preferably shaped to correspond to the configuration selected for the guides 6. In the illustrated example, the bores 9 have a cylindrical shape, to receive the rod-shaped guides 6, and the structures are sized to develop a sliding engagement between the guides 6 and the bores 9. Other configurations can also be implemented, if desired. For example, the shape of the bores 9 need not correspond to the shape of the guides 6, although a complementary configuration is required. Structures can additionally be provided to regulate movement of the head 3 along the guides 6. For example, friction-inducing structures can be provided, such as washers or O-rings, to cause the head 3 to remain in a selected position. Detent structures can also be provided to regulate the position of the head 3 along the guides 6, or to prevent separation of the head 3 from the guides 6.

The body 8 of the head 3 preferably has a configuration which complements the base 2 of the apparatus 1. For example, as is best illustrated in FIG. 2, the bottom 10 of the body 8 is shaped to cooperate with the top 11 of the frame 4 of the base 2. The overall outer shape of the head 3 is preferably substantially coextensive with the outer shape of the frame 4 of the base 2. Such cooperation is preferred so that when the head 3 is lowered onto the base 2, the operative portions of the apparatus 1, and the produce being operated upon, will be safely enclosed by the cooperating structures.

A pair of handles 12 extend from the body 8 of the head 3, for engagement by the hands of a user of the apparatus 1. The handles 12 preferably extend from opposing sides of the head 8, as illustrated. Other handle structures can also be used, if desired, such as multiple, discrete handles, or a projecting ring which extends around the perimeter of the body 8, provided the structure which is used can also be grasped from below so that the head 3 can be lifted to its raised position following use.

Figure 3:
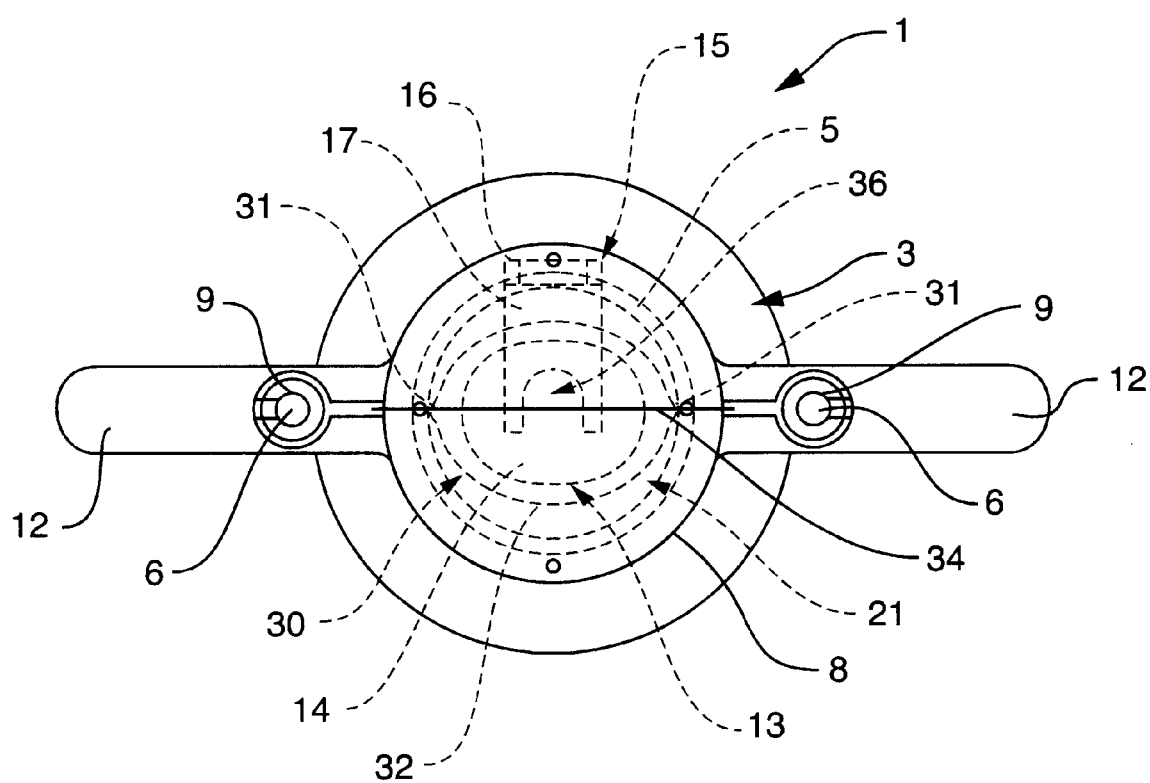
FIG. 3 is a top plan view of the apparatus shown in FIG. 1, also showing structure located beneath the head of the apparatus.

The pedestal 5 of the base 2 includes a cradle 13 for receiving the produce which is to be operated upon. The cradle 13 is formed as a depression in the pedestal 5, and is preferably shaped to assist in receiving the produce so that the produce is effectively positioned for those operations which are to follow, and to assist in holding the produce in position during such operations. Referring to FIG. 3, for the example of a lemon, which is in the general shape of a spheroid, the cradle 13 is formed as a pocket which preferably has an oblong, or oval shape to cooperate with the body of the lemon so that the lemon is supported in the cradle 13 and so that the sides of the lemon can be engaged to the extent possible by the walls 14 of the cradle 13. The oval-shaped pocket shown in FIG. 3 can be modified to provide a generally egg-shaped, spherical or conical pocket for receiving the lemons, if desired.

The size and shape of the cradle 13 can be varied responsive to the type of produce which is being operated upon, as well as the size and shape of the produce of a given type. For example, the above-described cradle 13 is configured for operations performed on lemons. Lemons, as with other produce, tend to vary widely in terms of their size and shape, but are traditionally distributed in standardized "counts". The counts are determined by an average number of lemons that can be held in a standardized container, or crate. For example, so-called 165 count lemons (an average of 165 lemons in a standard crate) are preferred for many bar and restaurant applications, although some applications lend themselves better to the somewhat larger 140 count lemons (an average of 140 lemons in a standard crate). The size and shape of the cradle 13 can be varied to accommodate the lemons of a particular count, irrespective of their variations in size and shape. Oval or egg-shaped pockets are presently considered preferred for such produce. The cradle 13 can similarly be modified to accommodate other types of produce, such as by providing a generally spherical or conical pocket forming a somewhat larger cradle to accommodate produce such as oranges or grapefruits.

The pedestal 5, or the base 2, is further provided with a bracket 15 which extends over the cradle 13. The bracket 15 preferably includes a vertical section 16 coupled with the base 2, and a horizontal section 17 which projects from the end of the vertical section 16. The vertical section 16 of the bracket 15 has a length, and the horizontal section 17 has an extension, which preferably develops a gap 18 between the horizontal section 17 of the bracket 15 and the uppermost surface 19 of the pedestal 5 which is slightly larger than the produce which is to be placed in the cradle 13. As an example, a gap 18 which develops a spacing of 2 inches ±0.125 inches is presently considered preferred for the 165 count lemons previously referred to.

The gap 18 is preferably sized to permit the produce to be readily introduced between the bracket 15 and the pedestal 5, so that the produce is easily introduced into the cradle 13, and so that the produce will be securely retained in the cradle 13 during operations of the apparatus 1 on the produce, as will be discussed more fully below. The significantly irregular nature (size and shape) of the lemons makes it difficult to correctly establish the gap 18. For this reason, the leading edge of the horizontal section 17 of the bracket 15, the opposing uppermost surface 19 of the pedestal 5, and preferably both of these structures, are preferably provided with reduced edges 20a, 20b, forming undercut portions that can better accommodate irregularities in the size and shape of the lemons. The reduced edges 20a, 20b allow the gap 18 to be set more narrowly, to more securely retain the lemons in the cradle 13 while ensuring that the widest range of lemons can be readily passed between the horizontal section 17 of the bracket 15 and the uppermost surface 19 of the pedestal 5. The bracket 15 can also be made adjustable (in height and/or extension) relative to the pedestal 5, if desired, to provide for adjustment of the gap 18.

Figure 4:
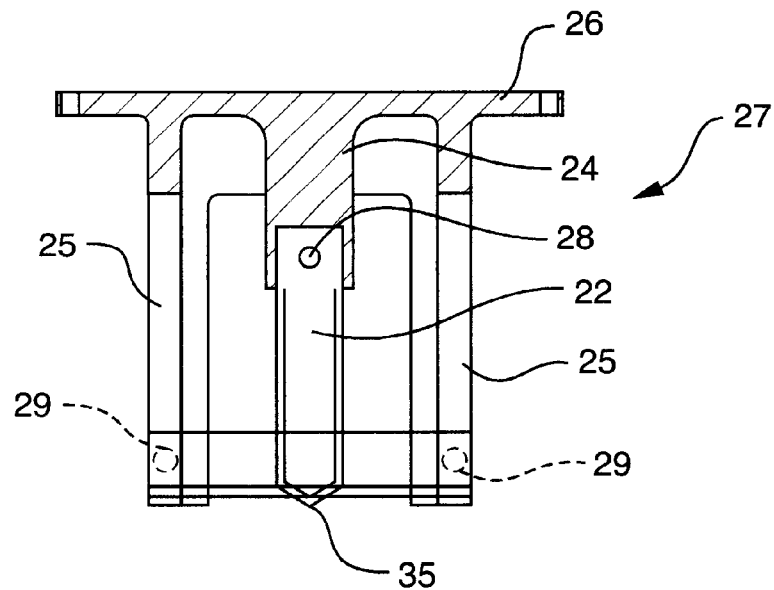
FIG. 4 is a cross-sectional view of a blade-receiving fixture, separated from the head of the apparatus.

The body 8 of the head 3 develops a cavity 21 for receiving one or more blades which can interact with produce placed in the cradle 13 of the pedestal 5. Referring to FIGS. 2 and 4, a single blade 22 is centrally located in the cavity 21, and a pair of blades 23 are located on opposing sides of the blade 22. The blade 22 is attached to and projects downwardly from a mounting block 24, which is centrally located within the cavity 21. A series of four mounting brackets 25 are provided to receive and position the blades 23 as will be discussed more fully below.

The mounting structures 24, 25 which receive the blades 22, 23 extend downwardly from a mounting plate 26. The mounting plate 26 is preferably removably associated with the head 3, to develop a removable fixture 27 for receiving the blades 22, 23. The use of a removable fixture is preferred to facilitate the servicing and replacement of the blades 22, 23. The mounting plate could also be formed unitary with the body 8 of the head 3, if desired, developing a replaceable head assembly. The blades 22, 23 are preferably removably connected to their respective mounting structures 24, 25, by the mounting screws 28, 29, to facilitate servicing of the blades 22, 23. The blades 22, 23 could also be formed unitary with the mounting structures 24, 25, if desired, to develop a disposable fixture for the blades.

Figure 5:
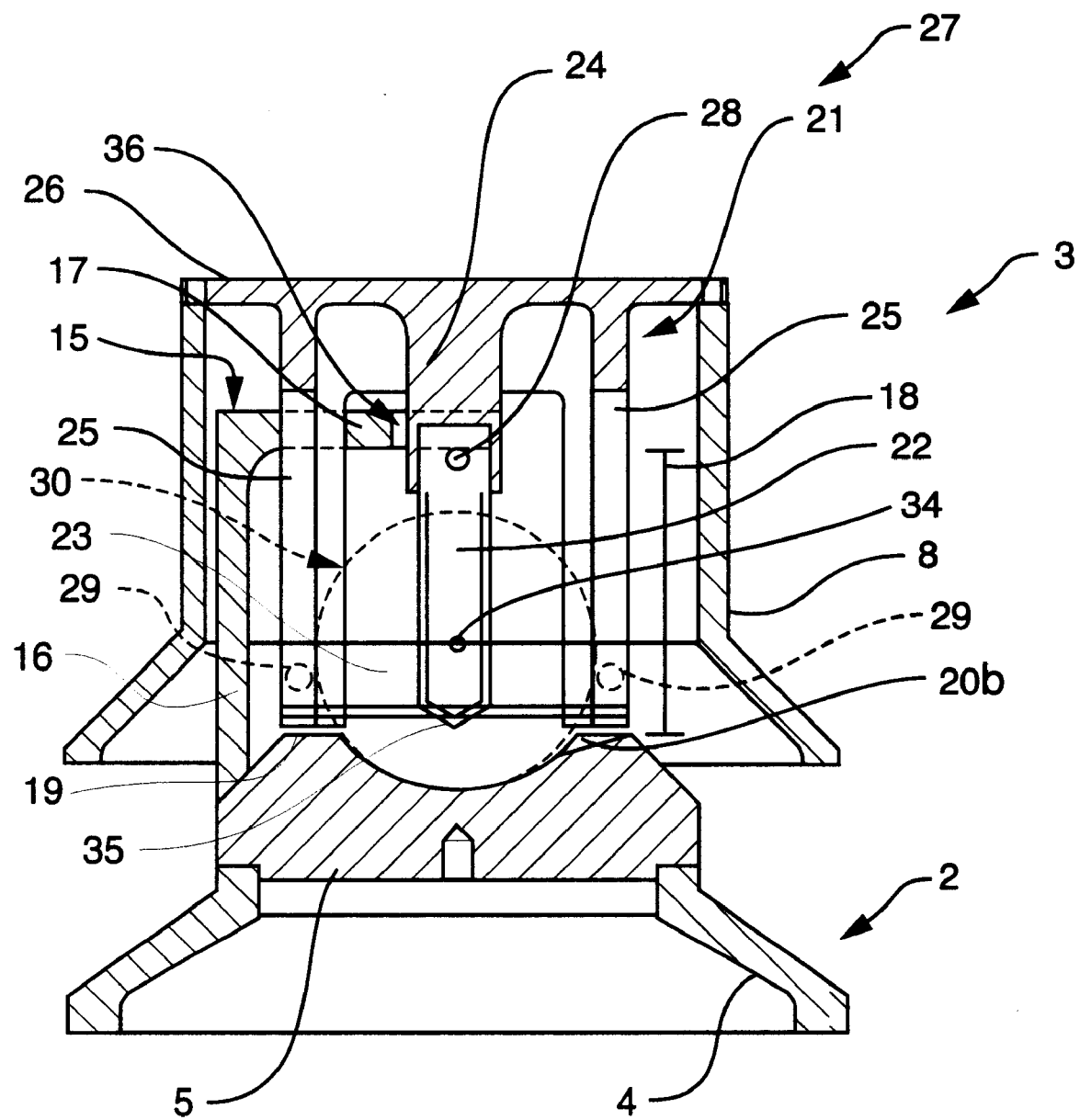
FIG. 5 is a cross-sectional view of portions of the apparatus of FIG. 1, showing interaction between the fixture of FIG. 4 and the base of the apparatus.

FIGS. 2, 3 and 5 illustrate preferred placement of the blades 22, 23 in conjunction with a lemon 30, which is shown in phantom as an example of produce to be operated upon by the apparatus 1. The lemon 30 has been placed in the cradle 13, lying on its side. As a result, nubs 31 of the lemon 30 are caused to project from horizontally opposing ends of the body 32 of the lemon 30, and the core membrane 33 which extends between the end nubs 31 will be placed in the substantially horizontal orientation which is shown.

Referring to FIGS. 2 and 4, the blade 22 is located above a longitudinal center line 34 corresponding with the axial center (the core) of the lemon 30, in general alignment with the core membrane 33, substantially at the midpoint along the core membrane 33. The blade 22 preferably has a length which will cause the tip 35 of the blade 22 to penetrate to a position beyond the longitudinal center line 34, to sever the core membrane 33 of the lemon 30 at a position approximately at the midpoint of the lemon 30. It has been found that following a sectioning operation, either manually or using a mechanical device, the resulting wedges will then each include a slit in the core membrane which allows a wedge to be placed over the rim of a glass, or the like, achieving the desired visual effect for the served beverage.

To provide such a result, the blade 22 preferably has a length which will establish a longitudinal penetration of the blade through more than 50% of the lemon 30, to make sure the core membrane 33 is effectively severed. Penetration of the blade 22 through between 60 to 75% of the lemon is presently considered preferred to avoid the potential for fully severing wedges of the lemon following the sectioning operation, with penetrations of between 65 to 70% being particularly preferred. Although penetrations in excess of 75% are presently considered less preferred, it would also be possible to achieve penetrations extending through, or even beyond the lemon, if desired.

The configuration selected for the tip 35 of the blade 22 will also tend to effect the amount of penetration established for the blade 22. Generally speaking, for a shorter tip 35, less penetration of the blade 22 will be needed to ensure that the core membrane 33 is effectively severed. For a longer tip 35, more penetration of the blade 22 will be needed to ensure that the core membrane 33 is effectively severed. The tip 35 can be formed with any of variety of configurations, from a square edge to a pointed tip. The triangular tip 35 shown in FIGS. 4 and 5 is presently considered preferred. The straight edges of the tip 35 can also be curved, if desired.

Figure 6:
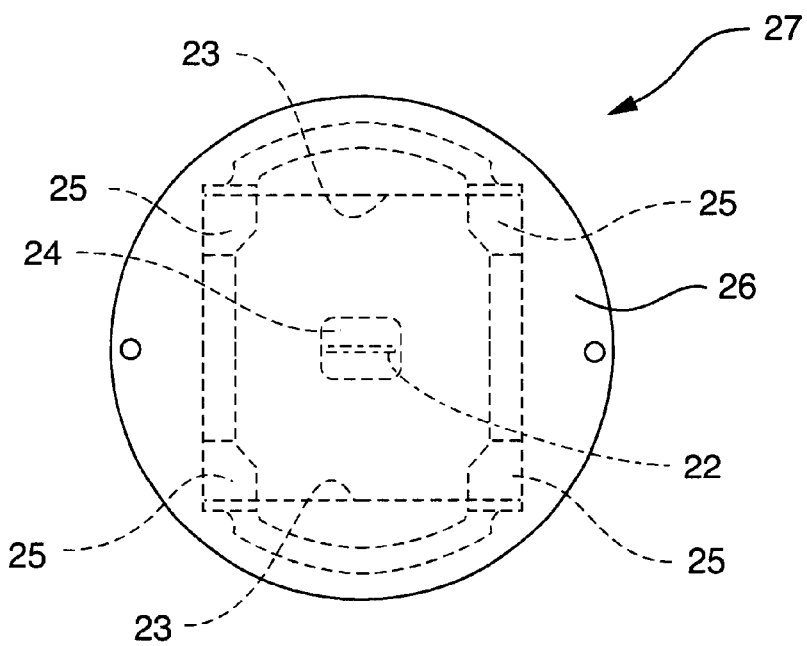
FIG. 6 is a top plan view of the fixture shown in FIG. 4.

Referring to FIG. 6, penetration of the blade 22 is preferably established automatically, as a function of the extension of the blade 22 from the mounting block 24, the height of the body 8 of the head 3 and the pedestal 5 of the base 2, and the limiting contact which is established between the bottom 10 of the head 3 and the top 11 of the base 2. In this way, proper penetration of the blade 22 into the produce is automatically established upon closure of the head 3 over the base 2, using the handles 12.

The width of the blade 22 is preferably selected to be sufficiently wide to make sure the blade 22 will encounter the core membrane 33, yet sufficiently narrow to avoid the potential for completely severing a wedge of the produce following the sectioning operation. A width of 0.5 inches ±0.062 inches is presently considered preferred. The preferred avoidance of fully severed wedges following the sectioning operation will also have an effect upon the length of the blade 22, and the shape selected for the tip 35, because significant penetration of the blade 22 through the produce could also promote separation of some of the resulting wedges.

The blades 23 are located above the nubs 31 of the lemon 30, in general alignment with the interface between the nubs 31 and the body 32 of the lemon. The length of the blades 23 need only be sufficient to permit the blades 23 to be joined to the mounting brackets 25. The width of the blades 23 need only be sufficient to provide the blades 23 with the structural integrity required to effectively slice through the produce being operated upon.

Referring to FIG. 6, the mounting brackets 25 are positioned to establish the proper separation for the blades 23 and to avoid interference with the produce as the head 3 is lowered onto the base 2. The length of the mounting brackets 25 need only be sufficient to ensure that the blades 23 fully sever the nubs 31 from the body 32 of the lemon 30, but is preferably selected for placement of the blades 23 at a position significantly beyond the longitudinal center line 34 to ensure that the nubs 31 are fully severed from the body 32. In this way, proper positioning of the blades 23 relative to the nubs 31 is automatically established upon closure of the head 3 over the base 2, using the handles 12.

To provide such a result, the blades 23 are preferably set (by the mounting brackets 25) to establish a penetration of the blades 23 to a position which is at least 20% beyond the longitudinal center line 34 (equivalent to a 60% penetration of the lemon 30 in the cradle 13), to make sure the nubs 31 are effectively severed from the body 32. A penetration of the blades 23 to a position which is at least 40% beyond the longitudinal center line 34 (equivalent to a 70% penetration of the lemon 30 in the cradle 13) is particularly preferred to ensure that the nubs 31 are effectively severed from the body 32 of the lemon 30, irrespective of the significant irregularities that such produce can exhibit. Penetrations in excess of these amounts are also possible, provided that steps are taken to ensure that there is no interference between the blades 23, and their supporting structures, and the remaining structural elements of the apparatus 1.

The blades 23 are also preferably set (by the mounting brackets 25) to establish a spacing (or gap) between the blades 23 which is sufficient to make sure the nubs 31 are effectively severed from the body 32 while avoiding the excessive removal of useful portions of the lemon 30 from the body 32. For the 165 count lemons previously referred to, a spacing between the pair of blades 23 of 2.375 inches ±0.125 inches will provide a satisfactory result. For the 140 count lemons, a spacing between the pair of blades 23 of 2.875 inches ±0.125 inches will provide a satisfactory result. Irrespective of the spacing selected for a particular count, the blade 22 will be positioned substantially centrally between the opposing blades 23, to achieve its desired severing function. To this end, the blade 22 is preferably set to extend 0.125 inches ±0.062 inches beyond the extension set for the blades 23.

In its preferred configuration, the apparatus 1 will include both the blade 22 and the pair of blades 23. In this way, the nubs 31 can be removed from the lemon 30 simultaneously with slitting of the core membrane 33, responsive to a single closure of the head 3 over the lemon 30 which is then positioned in the cradle 13. For operations where it is only desired to remove the nubs 31, or to slit the core membrane 33, the desired result can be achieved either by removing the unwanted blade or blades from their mounting structures, or by deleting mounting structures from the manufactured mounting plate 26. In either case, the blade 22 and/or the blades 23 will be fully enclosed within the cavity 21 as the head 3 is closed over the produce, achieving the desired severing operations while avoiding potential contact with the user operating the apparatus 1.

Lowering the head 3 onto the base 2 of the apparatus 1 will cause the blade 22 to enter the lemon 30 and will cause the blades 23 to frictionally engage the opposing ends of the lemon 30. As a result, whether the blades 22, 23 are used together or separately, the lemon 30 will tend to remain entrained by the blade 22 and/or the blades 23 as the head 3 is lifted from the base 2. This will tend to leave the lemon 30 within the cavity 21 as the head 3 is lifted from the base 2, following the desired operations which have taken place. While it would be possible to remove the entrained lemon 30 from the cavity 21, this is preferably avoided to prevent the user of the apparatus 1 from coming into contact with the blades 22, 23. The bracket 15 is provided to prevent such a result, by engaging the lemon 30 as the head 3 is raised from the base 2, stripping the lemon 30 from the blades 22, 23. The bracket 15 is provided with an opening 36 in the horizontal section 17 to receive the blade 22 and the mounting block 24, to achieve its desired stripping function without interfering with desired operations of the blade 22.

It will be understood that various changes in the details, materials and arrangement of parts which have been herein described and illustrated in order to explain the nature of this invention may be made by those skilled in the art within the principle and scope of the invention as expressed in the following claims. Many of these alternatives have already been indicated. A further alternative relates to overall orientation. The apparatus 1 has been described for vertical movement of the blades 22, 23, downwardly through the lemons, as is preferred. However, it is also possible to develop other orientations for the blades 22, 23. For example, the structures associated with the base 2 and the head 3 can be reversed, so that the lemons are driven through stationary blades 22, 23. The apparatus 1 can be placed in orientations other than the vertical orientation shown, if desired for a particular application. Alternative movements can also be developed for the blades 22, 23. For example, the blades 22, 23 can be caused to progress upwardly through a lemon 30 or through the side of a lemon 30 positioned in the cradle 13. Any of a variety of alternative configurations can be developed, provided that appropriate steps are taken to properly position the blades 22, 23 relative to the lemons positioned in the cradle 13. Irrespective of orientation, the bracket 15 can operate to effectively retain the lemons 30 in the cradle 13, in a proper position relative to the blades 22, 23.

What is claimed is:

1. A method for processing produce, comprising the steps of:

placing the produce in a cradle having a pocket for receiving the produce, orienting the produce within the cradle so that a longitudinal center line determined by the cradle is placed in substantial alignment with remnants of a membrane forming a core which extends through an axial center defined by the produce, between opposing ends of the produce; and moving a head and the cradle relative to each other, wherein the head includes a blade which is received by the head so that the blade is placed in an orientation aligned with the longitudinal center line determined by the cradle, and wherein movement of the head and the cradle toward each other causes the blade to intersect with the longitudinal center line determined by the cradle, severing the core membrane.

2. The method of claim 1 wherein the blade is placed substantially normal to the longitudinal center line.

3. The method of claim 2 which further includes the step of positioning the blade to intersect with the longitudinal center line near a midpoint of the longitudinal center line corresponding to a midpoint along the core membrane of the produce placed in the cradle.

4. The method of claim 1 wherein the blade has a leading edge for intersecting with the longitudinal center line, and which further includes the step of causing the leading edge of the blade to penetrate to a position located beyond the longitudinal center line.

5. The method of claim 4 wherein the cradle defines a region for receiving the produce which has a central axis corresponding to the longitudinal center line defined by the cradle, and which further includes the step of causing the leading edge of the blade to penetrate through from 60 to 75% of the defined region.

6. The method of claim 5 wherein the leading edge of the blade is caused to penetrate through from 65 to 70% of the defined region.

7. The method of claim 1 which further includes the step of retaining the produce in the cradle during the processing.

8. The method of claim 7 wherein the produce is retained in the cradle by a bracket coupled with the cradle, and which further includes the step of forming a gap between the bracket and edge portions of the cradle for receiving the produce in the cradle.

9. The method of claim 8 which further includes the step of providing undercut portions in the bracket and in the edge portions of the cradle adjacent to the gap, for receiving the produce.

10. The method of claim 8 which further includes the step of adjusting the gap so that the produce can pass through the gap to the cradle.

11. The method of claim 7 which further includes the steps of moving the head and the cradle away from each other after the blade is caused to intersect with the longitudinal center line determined by the cradle and sever the core membrane, and stripping the produce from the blade, retaining the produce within the cradle.

12. The method of claim 11 which further includes the step of withdrawing the processed produce from the cradle after the processing.

13. The method of claim 1 which further includes the step of moving the head and the cradle toward each other, drawing the blade into contact with the produce and causing the blade to penetrate the produce.

14. The method of claim 13 which further includes the step of sectioning the processed produce by developing sections of the produce extending in a direction substantially parallel with the axial center line defined by the produce, exposing the severed remnants of the core membrane.

15. The method of claim 14 which further includes the step of engaging a rim of a glass with the exposed, severed remnants of the core membrane, hanging the developed sections from the rim of the glass.

16. The method of claim 14 which further includes the step of automatically sectioning the processed produce in a produce sectioning apparatus.

17. The method of claim 1 which further includes the step of placing the produce in the cradle so that end portions of the longitudinal center line determined by the cradle are placed in substantial alignment with opposing ends of the produce placed in the cradle, and wherein the head further includes a pair of blades which are received by the head so that the pair of blades are placed in an orientation aligned with the end portions of the longitudinal center line, and wherein movement of the head and the cradle toward each other causes the pair of blades to intersect with the end portions of the longitudinal center line.

18. The method of claim 17 wherein the pair of blades are placed substantially normal to the longitudinal center line.

19. The method of claim 17 wherein the pair of blades have leading edges for intersecting with the longitudinal center line, and which further includes the step of causing the leading edges of the pair of blades to penetrate to a position located beyond the longitudinal center line.

20. The method of claim 19 wherein the cradle defines a region for receiving the produce which has a central axis corresponding to the longitudinal center line defined by the cradle, and which further includes the step of causing the leading edges of the pair of blades to penetrate through at least 60% of the defined region.

21. The method of claim 20 wherein the leading edges of the pair of blades are caused to penetrate through at least 70% of the defined region.

22. The method of claim 17 wherein the blade is positioned substantially centrally between the pair of blades, and which further includes the step of simultaneously removing the portions from the produce and severing the remnants of the core membrane.

23. A method for processing produce, comprising the steps of:

placing the produce in a cradle having a pocket for receiving the produce, orienting the produce within the cradle so that end portions of a longitudinal center line determined by the cradle are placed in substantial alignment with opposing ends of the produce placed in the cradle; and moving a head and the cradle relative to each other, wherein the head further includes a pair of blades which are received by the head so that the pair of blades are placed in an orientation aligned with the end portions of the longitudinal center line, and wherein movement of the head and the cradle toward each other causes the pair of blades to intersect with the end portions of the longitudinal center line.

24. The method of claim 23 wherein the pair of blades are placed substantially normal to the longitudinal center line.

25. The method of claim 23 wherein the pair of blades have leading edges for intersecting with the longitudinal center line, and which further includes the step of causing the leading edges of the pair of blades to penetrate to a position located beyond the longitudinal center line.

26. The method of claim 25 wherein the cradle defines a region for receiving the produce which has a central axis corresponding to the longitudinal center line defined by the cradle, and which further includes the step of causing the leading edges of the pair of blades to penetrate through at least 60% of the defined region.

27. The method of claim 26 wherein the leading edges of the pair of blades are caused to penetrate through at least 70% of the defined region.

28. The method of claim 23 which further includes the step of retaining the produce in the cradle during the processing.

29. The method of claim 28 wherein the produce is retained in the cradle by a bracket coupled with the cradle, and which further includes the step of forming a gap between the bracket and edge portions of the cradle for receiving the produce in the cradle.

30. The method of claim 29 which further includes the step of providing undercut portions in the bracket and in the edge,portions of the cradle adjacent to the gap, for receiving the produce.

31. The method of claim 29 which further includes the step of adjusting the gap so that the produce can pass through the gap to the cradle.

32. The method of claim 28 which further includes the steps of moving the head and the cradle away from each other after the pair of blades are caused to intersect with the longitudinal center line determined by the cradle and remove the opposing edges of the produce, and stripping the produce from the pair of blades, retaining the produce within the cradle.

33. The method of claim 32 which further includes the step of withdrawing the processed produce from the cradle after the processing.

34. The method of claim 23 which further includes the step of moving the head and the cradle toward each other, drawing the pair of blades into contact with the produce and causing the pair of blades to penetrate the produce.

35. The method of claim 34 which further includes the step of sectioning the processed produce by developing sections of the produce extending in a direction substantially parallel with the axial center line defined by the produce, and providing flat end portions at ends of the developed sections.

36. The method of claim 35 which further includes the step of automatically sectioning the processed produce in a produce sectioning apparatus.

* * * * *